(12) United States Patent
Omura et al.

(10) Patent No.: US 6,430,620 B1
(45) Date of Patent: Aug. 6, 2002

(54) SYSTEM AND METHOD FOR LOCATING AND RETRANSFERRING LOST DATA THROUGH THE USE OF POSITION NUMBER WITHIN A FILE

(75) Inventors: Takeshi Omura, Kyoto; Kazuhiko Hirayama, Osaka-fu, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/047,443

(22) Filed: Mar. 25, 1998

(30) Foreign Application Priority Data

Mar. 25, 1997 (JP) .............................. 9-071111
Oct. 16, 1997 (JP) ............................. 9-283858

(51) Int. Cl.[7] ..................... G06F 15/16; G06F 15/173
(52) U.S. Cl. .................. 709/231; 709/203; 709/224; 709/232; 709/233; 714/748
(58) Field of Search .................. 375/240; 379/24, 379/93.24; 395/200; 370/468, 235; 709/203, 206, 231, 232, 233, 234, 237, 236, 224, 238; 714/748, 746, 747, 749; 358/404

(56) References Cited

U.S. PATENT DOCUMENTS

| | | | | |
|---|---|---|---|---|
| 5,563,930 A | * | 10/1996 | Pester, III | 379/34 |
| 5,566,208 A | * | 10/1996 | Balakrishnan | 375/240 |
| 5,659,539 A | * | 8/1997 | Porter et al. | 395/200 |
| 5,768,528 A | * | 6/1998 | Stumm | 709/231 |
| 5,777,986 A | * | 7/1998 | Grossman | 370/235 |
| 5,844,969 A | * | 12/1998 | Goldman et al. | 379/93.24 |
| 5,903,724 A | * | 5/1999 | Takamoto et al. | 709/200 |
| 5,907,556 A | * | 5/1999 | Hisanaga et al. | 370/468 |
| 5,956,729 A | * | 9/1999 | Goetz et al. | 707/104 |
| 6,026,088 A | * | 2/2000 | Rostoker et al. | 370/395 |
| 6,031,818 A | * | 2/2000 | Lo et al. | 370/216 |
| 6,038,216 A | * | 3/2000 | Packer | 370/231 |
| 6,061,820 A | * | 5/2000 | Nakakita et al. | 714/751 |
| 6,078,564 A | * | 6/2000 | Lakshman et al. | 370/235 |
| 6,085,252 A | * | 7/2000 | Zhu et al. | 709/231 |
| 6,112,323 A | * | 8/2000 | Meizlik et al. | 714/748 |
| 6,115,141 A | * | 9/2000 | Kim | 358/404 |
| 6,115,393 A | * | 9/2000 | Engel et al. | 370/469 |
| 6,161,141 A | * | 12/2000 | Dillon | 709/230 |
| 6,175,571 B1 | * | 1/2001 | Haddock et al. | 370/423 |
| 6,223,211 B1 | * | 4/2001 | Hamilton et al. | 709/203 |

* cited by examiner

Primary Examiner—Le Hien Luu
Assistant Examiner—William C. Vaughn, Jr.
(74) Attorney, Agent, or Firm—McDermott, Will & Emery

(57) ABSTRACT

The present invention relates to a data transfer method and a system in a computer network to which are connected a number of computers, more specifically to a data transfer method of stream data continuous in time series and a system for it. The present invention makes a request for change of rate from the client 470 in correspondence to the state of vacancy of said receiving buffer 412, and changes the send rate on the server 400 based on that request for change of rate. This prevents any overflow of stream data from the receiving buffer 412. Furthermore, based on the re-transfer request issued from the client 470 in correspondence to the loss of stream data received by said packet receiving means 410, the storing means on the server 400 sends out data corresponding to the lost data concerned. This makes it possible to compensate for the loss in case of occurrence of any data loss.

8 Claims, 14 Drawing Sheets

FIG. 4
Position numbers of specific file
| 0 f | 1 f | 2 f | 3 f |
|---|---|---|---|
| 4 f | 5 f | 6 f | 7 f |
| 8 f | 9 f | 10 f | 11 f |
|  |  |  |  |
F
FIG. 5(a)
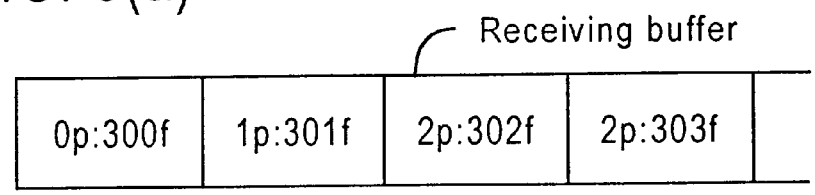
Receiving buffer
| 0p:300f | 1p:301f | 2p:302f | 2p:303f |
FIG. 5(b)
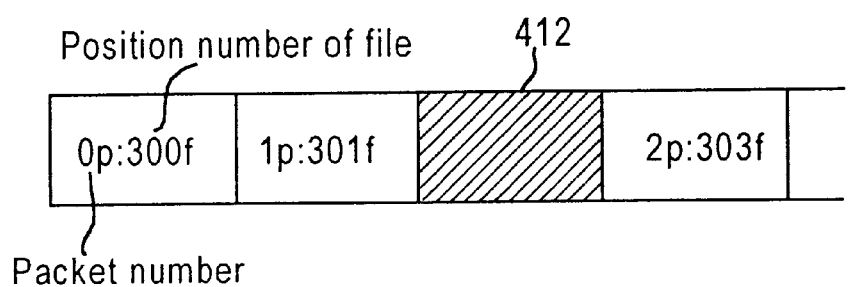
Position number of file — 412
| 0p:300f | 1p:301f | ///// | 2p:303f |
Packet number

FIG. 6(a)

Data packet

| ① Transmitter's address |
|---|
| ② Transmission destination address |
| ③ Packet type identifier (Data) |
| ④ Data size |
| ⑤ Packet Number |
| Data |

FIG. 6(b)

Request for rate re-transfer

| ① Transmitter's address |
|---|
| ② Transmission destination address |
| ③ Packet type identifier (Rate change request) |
| ⑥ Requested rate, in the case of rate change request |

FIG. 6(c)

Request for re-transfer

| ① Transmitter's address |
|---|
| ② Transmission destination address |
| ③ Packet type identifier (Re-transfer request) |
| ⑥ Position number regarding re-transfer request, in the case of re-transfer request |
| ④ Data size |

FIG. 6(d)

Request for start of -transfer

| ① Transmitter's address |
|---|
| ② Transmission destination address |
| ③ Packet type identifier (Transfer start request) |
| ⑦ File name, file number |
| ⑧ Transfer start position number |

SYSTEM AND METHOD FOR LOCATING AND RETRANSFERRING LOST DATA THROUGH THE USE OF POSITION NUMBER WITHIN A FILE

FIELD OF THE INVENTION

The present invention relates to a data transfer method and a system in a computer network to which are connected a number of computers, more specifically to a data transfer method of stream data continuous in time series and a system for it.

BACKGROUND OF THE INVENTION

With improvement of computer capability and generalization of connection to network of computers in recent years, there is a growing request for real time transfer of stream data through computer network. Stream data here means data continuous in time series such as image, sound, etc. This stream data is naturally incorporated in packets and transferred through a network. Here this data is called stream data regardless whether the data is handled in units of prescribed number of groups of data or handled in disregard of such units of group.

FIG. 14 shows an example of conventional stream data transfer system. This system is composed of a server 500 on the side providing data and a client 508 on the side receiving the supply of data, and the network 507 intervenes between the two. A conventional system will be further explained hereafter based on FIG. 14 together with its procedure.

The server 500 is constructed as described below. Namely, as explained hereafter, when a request for start of transfer of stream data is given from the client 508 to the sever, this request is delivered to the start request processing means 516 through the packet receiving means 501, and this start request processing means 516 starts the rate controlling means 505. This rate controlling means 505 reads out stream data from the storing device 503 such as hard disc, etc., and stores it in the transmission buffer 504 temporarily.

A prescribed send rate is set in advance in said rate controlling means 505. This send rate is determined according to the reproduction rate of the client 508 and the capacity available for transfer of the network. The stream data stored in the transmission buffer 504 is read out at said prescribed send rate based on the control of the rate controlling means 505 and transferred to the packet transmitting means 502, and the packet transmitting means 502 sends out this stream data to the network 507 by incorporating it in packets.

On the other hand, the client 508 is constructed as described below. Namely, the data packets received from the network 507 are received by the packet receiving means 509, and the packets are disassembled here to be stored on the receiving buffer 511 one after another. The data reproducing means 512 reads out the data stored on the receiving buffer 511 as above sequentially at prescribed reproducing ate and delivers it to a display unit.

To control the start of transfer, a transfer start requesting means 517 is provided on the client 508 side, and this transfer start requesting means 517 issues a request for start of transfer according to the operator's instructions. This request for start of transfer is delivered to the packet transmitting means 510, incorporated into transfer start request packets here, and transferred to the server 500 through the network 507. As a result, the start request processing means 516 of the server 500 starts the rate controlling means 505 to start data transfer as described above.

Such procedure is repeated for the transfer of stream data between the server and the client. However, a computer network generally produces a certain amount of packet loss depending on the state of the network concerned, while packet loss is produced in case of occurrence of an overflow of the receiving buffer due to shortage of processing capacity of the client's computer, or fluctuation of reproducing ate of stream data, etc.

Therefore, also on said conventional system, an arrangement is made for compensation in such case of data loss.

Namely, the loss rate reporting means 513 of the client 508 constantly monitors the receiving buffer 511 and, in case of occurrence of any data loss, reports data loss rate to the packet transmitting means. The packet transmitting means 510 prepares a rate change request packet including an address of the server 500, an identifier to the effect that it is a send rate change request packet, and said loss rate, and then transmits the packet to the network.

The rate change request packet sent out this way is received by the packet receiving means 501 of the server 500, is identified as a rate change request packet here, and then is delivered to the rate changing means 506. This rate changing means 506 is provided, in the form of a table, with send rates corresponding the loss rate on said client 508 contained in said rate change request packet for example, and the rate changer 506 determines a new send rate by referring to this table, and transfers that send rate to the rate controlling means 505. Upon receipt of this transfer, the rate controlling means 505 reads out the stream data from the transmission buffer 504 by lowering (or raising) send rate and delivers it to the packet transmitting means 502.

However, in such conventional stream data transfer system, the send rate from the server 500 is lowered only after any loss of data is detected by the client 508 as described above. Therefore there is no way to reproduce any data once lost. In addition, the images fluctuates in case any data partly lost is reproduced.

FIG. 15 shows a method to transfer data other than stream data such as text data, for example, from the server 500 to the client 508.

Namely, each time when data "Data" in units of prescribed size is transferred from the server 500 to the client 508, an acknowledgement signal "Ack" is returned from the client 508 to the server 500 and, upon receipt of this acknowledgement signal "Ack", the server sends out a new data "Data".

According to this method, the client 508 does not return the acknowledgement signal "Ack" when it received a data with loss, making it impossible for the server to send out the next "Data". In this state, a shortage of data is produced on the receiving buffer 511 because the next data is not transferred until a prescribed time To elapses, for example. As a result, the image stops or fluctuates.

The object of the present invention, proposed in view of said defects of the conventional stream data transfer system, is to provide a more reliable stream data transfer method and a system, by lowering the send rate from the server before any loss of data is produced on the buffer of the client. Another object of the present invention is to provide a stream data transfer method and a system that transmits the lost data again even there is data is lost in the buffer of the client.

Yet another object of the present invention is to provide a stream data transfer method and its system, capable of effectively achieving said object, even in a multicast transfer system for transferring one same data to a plural number of clients simultaneously from the server.

SUMMARY OF THE INVENTION

The present invention adopts the means described below to achieve said objects. First, the stream data transfer system of the present invention comprises a server 400 and a client 470 as described below. In said server 400 the stream data read out from the storing means (storing device 403 and transmission buffer 404 in FIG. 1) at prescribed rate based on the control of the rate controlling means 405 are incorporated into data packets at the packet transmitting means 402. Next, the packets are transmitted to the client 470 through the network 300. The packet receiving means 401 receives request from the client 470.

Moreover, said client 470 receives, with the packet receiving means 410, the stream data sent out at prescribed rate from said server 400 through the network 300, stores it once on the receiving buffer 412 and reproduces it, and sends out necessary instruction to said server 400 from the packet transmitting means 411.

In said system, the present invention makes a request for change of rate from the client 470 in correspondence to the state of vacancy of said receiving buffer 412, and changes the send rate on the server 400 based on that request for change of rate.

To be concrete, a rate change requesting means 413 is provided on the client 470 side, to monitor the vacant capacity of the receiving buffer 412, and make a request for change of rate conformable to that vacant capacity. On the other hand, a rate change request inhibiting means 416 is provided on the server 400, to renew the send rate set on said rate controlling means 405, in response to the request for change of rate issued by the client 470 as described above.

This prevents any overflow of stream data from the receiving buffer 412.

Furthermore, based on the re-transfer request issued from the client 470 in correspondence to the loss of stream data received by said packet receiving means 410, the storing means on the server 400 sends out data corresponding to the lost data concerned.

To be concrete, a re-transfer requesting means 414 is provided on the client 470, to monitor loss of the data received by said packet receiving means 410, and make a request for re-transfer of the data corresponding to the lost data concerned. On the other hand, a re-transfer controlling means 407 is provided on the server 400, to perform re-transmission of the stream data corresponding to the lost data.

This makes it possible to compensate for the loss in case of occurrence of any data loss.

The present invention can be used independently with a construction necessary for said change of rate, and can be used independently with a construction for re-transfer, and can also be realized with a construction combining said 2 different types of processing.

By the way, in the case where said method is directly applied to a multicast transfer system capable of transferring one same data to a plural number of clients at a time, the server must cope with a plural number of requests from the respective clients constituting the multicast.

This means an increased load for the server and the network and, therefore, said method cannot be directly applied to a multicast transfer system.

For that reason, the present invention is realized in a way to issue, in correspondence to the state of vacancy of the receiving buffer of a specific client 41a belonging to the same multicast group, a request for change of rate from that specific client 41a to said server 400, and change the send rate of said server 400 based on that request for change of rate.

To be concrete, a rate change requesting means 413 is provided on a specific client 41a belonging to the same multicast group, to monitor the vacant capacity of said receiving buffer 412, and to make a request for change of rate corresponding to the vacant capacity to said server.

On the other hand, a rate change controlling means 406 is provided on the server 400, to renew the send rate set on said rate controlling means 405, in correspondence to said request for change of rate.

This makes it possible to avoid overflow of multicast stream data at the receiving buffers of the clients, while controlling increase of load on the server 400 and the network 300.

Still more, the present invention can also be realized in a way to issue, in correspondence to the loss of stream data received by the packet receiving means 410 of a specific client 41a belonging to said one same multicast group, a request for re-transfer from that specific client 41a to said server 400, and send out data corresponding to the lost data concerned from the storing means of said server 400.

To be concrete, the present invention will be constructed by providing a re-transfer requesting means 414 on a specific client 41a belonging to said one same multicast group, and providing a re-transfer controlling means 407 on said server 400. In this construction, it is so arranged that said re-transfer requesting means 414 monitors loss of the data received by said packet receiving means 410, and makes a request for re-transfer of the data corresponding to the lost data concerned to said server 400, while said re-transfer controlling means 407 makes a re-transfer of the stream data corresponding to said lost data, based on said request for re-transfer.

This makes it possible to compensate for the loss even in case of occurrence of any data loss, while controlling increase of load on the server and the network.

Yet more, it is so arranged that said specific client 41a issues said request for change of rate to said server 400 and all clients belonging to said one same multicast group. In this state, issuance of request for change of rate issued by other specific client by other specific client identical to the request for change of rate issued by said specific client is prohibited for a prescribed time set in advance. Or in the case where said server received one same request for change of rate from a plural number of clients within a prescribed time set in advance, it is possible to validate one of those requests for change of rate, and change the send rate of the server based on that request for change of rate.

To be concrete, said specific client 41a is provided, as shown in FIG. 9, with a rate change request inhibiting means 415 for inhibiting issuance of request for change of rate identical to the request for change of rate issued by other specific client for a prescribed time. Or, as shown in FIG. 10, said server 400 comprises the same rate change request processing means 408 for determining, in the case where the server 400 received one same said request for change of rate from a plural number of clients within a prescribed time set in advance, one of those requests for change of rate as valid.

Moreover, it is possible to issue said request for re-transfer from said specific client 41a to said server 400 and to all clients belonging to said one same multicast group, and inhibit issuance of request for re-transfer identical to said request for re-transfer from other specific client for a prescribed time set in advance. Or, it is possible to determine, in the case where said server 400 received one same said request for re-transfer from a plural number of clients within a prescribed time set in advance, one of those requests for re-transfer as valid, and send out data corresponding to the lost data from the storing means of said server 400.

To be concrete, said specific client 41a is provided, as shown in FIG. 9, with a re-transfer request inhibiting means 416 for inhibiting issuance of request for re-transfer identical to the request for re-transfer issued by other specific client for a prescribed time. Or, as shown in FIG. 10, said server 400 is constructed by comprising a one same re-transfer request processing means 409 for determining, in the case where the server 400 received one same said request for re-transfer from a plural number of clients within a prescribed time set in advance, one of those requests for re-transfer as valid.

By said procedure, it becomes possible to restrict the load on said server 400 and network 300.

Furthermore, before transmission of stream data said server 400 determines whether one client can coexiste with the other clients included in the same group or not after obtaining conditions to issue a request for changning of rate from each client. When the server 400 determines that the client cannot coexist in one same multicast group, it is possible for the server 400 to transfer the data to the client by other multicast group. Or when client has conditions with difficulty of coexistence in one same multicast group it is also possible for said specific client to receive the data as other multicast group.

To be concrete, said server 400 is provided, as shown in FIG. 11, with a transmission destination group split controlling means 418, to control in a way to transfer the data by other multicast group to said client having conditions with difficulty of coexistence in one same multicast group. In addition, said specific client is provided, as shown in FIG. 12, with a group split controlling means 419, to receive the data by other multicast group, in the case where that specific client has conditions with difficulty of coexistence in one same multicast group.

For that reason, clients having conditions enabling coexistence are made to belong to one same multicast group, to distribute stream data under separate multicast addresses to the respective multicast groups. Therefore, it becomes possible to improve the reliability of data transfer to a larger number of clients.

BRIEF DESCRIPTION OF THE DRAWINGS

FIG. 4 is a conceptual drawing showing position numbers on the file.

FIG. 5 is a conceptual drawing showing the data arrangement on the receiving buffer.

FIG. 6 is a conceptual drawing showing various types of packet structure used for the present invention.

EMBODIMENTS OF THE INVENTION

EMBODIMENT 1

Figure 1:
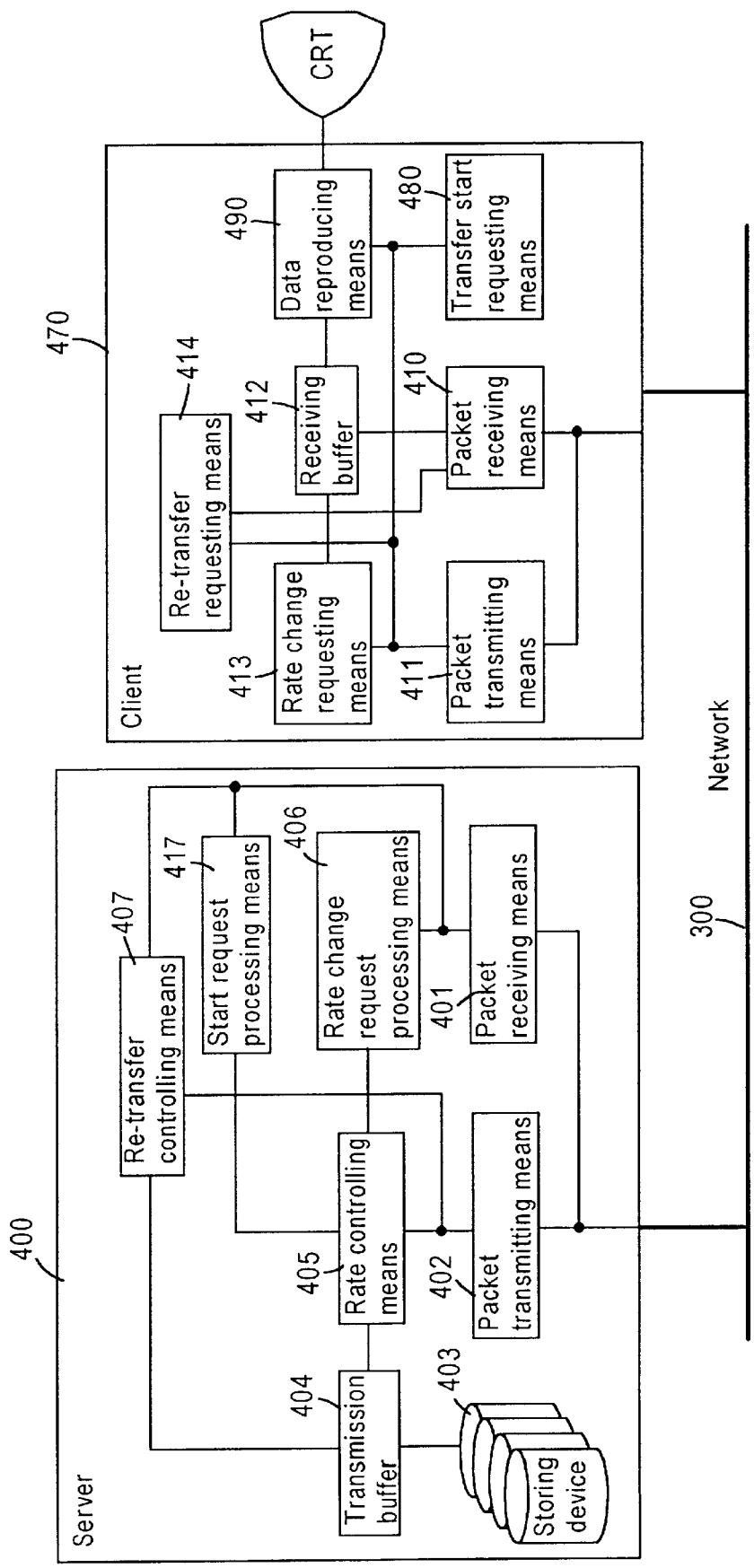
FIG. 1 is a construction drawing of one embodiment of the present invention.

FIG. 1 shows an embodiment of the stream data transfer system according to the present invention. The construction of the system according to the present invention will be explained hereafter together with its procedure based on FIG. 1.

This system is identical to said conventional system in that the server 400 and the client 470 are connected to each other through of a network 300.

As the operator gives an instruction for the transfer of a specific file by using input means such as keyboard, or cursor, etc. and displayed picture, the transfer start requesting means 480 of the client 470 notifies the packet transmitting means 411 of the request for start and, upon receipt of this notification, the packet transmitting means 411 sends out, as shown in FIG. 6(d), a transfer request packet carrying transmitter's address (1), transmission destination address (2), packet type identifier (request for start of transfer) (3), matters identifying the file (file name or file number) (7) and, as required, transfer start position number (8), to the network 300.

Said transfer start position number, generated by the rate controlling means 405 on the server 400 as described later, is a number indicating the position on the file of the data concerned other than the packet number attached to the data packet transmitted by the packet transmitting means 402, and is required for the re-transfer described later. Namely, it is a number corresponding to the readout starting position among the numbers assigned one after another (expressed with a suffix "f") to the sections formed by partitioning, as shown in FIG. 4, said specified file F into units of specific bytes [number of bytes corresponding to 1 packet, for example (1 kb, for example)]. And this number is of course 0 in the case where the file is read out from its head but indicates the number corresponding to the position concerned when the readout starts on the way. However, the operator specifies the transfer start position at a value which can be understood by the operator such as time required for reaching the readout start position from the head, for example, and this value is converted into said section number by said transfer start requesting means 480, although this position number, which must be incorporated in said data packet in the case of re-transfer to be described later, needs not be incorporated in said data packet in the case without re-transfer.

The transfer request packet sent out to the network 300 this way is received by the packet receiving means 401 of the server 400, judged here by said packet type identifier (3) as being a transfer request packet, and transferred to the start request processing means 417. Upon receipt of this transfer, the start request processing means 417 delivers the matters (7) identifying the file such as file name, file number, etc. and the transfer start position number (8) specified as above to the rate controlling means 405, and starts this rate controlling means 405. At this, the rate controlling means 405 reads out the stream data from the address corresponding to said transfer start position number (8) in the storing device 403 one after another, and once stores that data in the transmission buffer 404.

In said rate controlling means 405 are set a send rate determined depending on the reproduction rate of the client 470 described below and the capacity available for transmission of the network 300.

And the stream data stored in the transmission buffer 404 as above is read out from the transmission buffer 404 at said send rate and transferred to the packet transmitting means 402. The packet transmitting means 402 incorporates the stream data obtained this way in a data packet and sends it out to the network 300. This data packet carries, as shown in FIG. 6(*a*), address of transmitter (address of server 400) (1), transmision destination address (address of client 470) (2), packet identifier of being a data packet (3), data size (4) and packet number showing the order of packet (5) placed on the header, followed by the actual data.

To provide the system with a re-transfer function, information identifying the position on the file formed in the rate controlling means 405 in addition to said packet number, such as section number (position number) in the case where the file explained above by using FIG. 4 is partitioned into a prescribed size. Said packet number and this position number agree with each other in the case where the file is read out from the head of file and that the capacity unit of said 1 section agrees with the capacity unit of 1 packet, but they do not agree in the case where the two capacities are different or when the data is read out from the file as above halfway (See FIG. 5).

The data packet sent out to the network 300 as above is received by the packet receiving means 410 of the client 470, judged here by the packet identifier (3) of packet type as being a data packet, and is stored on the prescribed address on the receiving buffer 412, with reference to said packet number and the packet size.

Here, the packet receiving means 410 controls the packet number (5) attached by the packet transmitting means 402 on the server 400 as above, and the order of packets is duly controlled at the packet receiving means 410, even if the numbers of the packets arriving at the packet receiving means 410 one after another get out of order for some reason or another.

Moreover, the stream data transferred without omission of packet is stored on the receiving buffer 412 without vacancy as shown in FIG. 5(*a*) in correspondence to the respective packet numbers. However, in case there is any loss of packet, the stream data is stored on the receiving buffer 412 with a vacant area as shown in FIG. 5(*b*). Numbers having a suffix "p" in FIG. 5 are packet numbers, while numbers with a suffix "f" are position numbers on the file and, for making a re-transfer as explained later, the packet receiving means 410 of the client 470 not only controls the packet numbers as above but also has a function of controlling the position numbers of said file.

FIG. 5 shows an example in which, while the packet number gradually increases from 0, the position number on the file starts from on the way (300th position). Namely, it corresponds to a case where the file is read out not from the head but from on the way.

The data stored on the receiving buffer 412 as above is read out and reproduced by the data reproducing means 490 at prescribed reproducing ate. The reproducing ate, though variable in time in some cases depending on the type of image, should be set in a way to maintain an equilibrium between said send rate and reproduction rate as a matter of course. Moreover, since it is necessary to avoid, at this time, a state in which the data reproducing means 490 gains access to the receiving buffer 412 in the state without data on the receiving buffer 412, it is so arranged that reproducing starts from a state in which a certain amount of data is stored in the receiving buffer 412.

While the transfer of stream data is made between the server and the client with repetition of the procedure described above, said processing is exactly the same as the procedure in a conventional system, except for the description regarding the information (position number) identifying the position on the file.

In the case where, in the above operation, an equilibrium is established between the send rate of the packet transmitting means 402 on the server 400 side and the reproducing ate of the data reproducing means 490 on the client 470, the vacant area on the receiving buffer 412 is maintained at a constant value. However, there are cases where the vacant capacity on the receiving buffer 412 diminishes for reason of shortage of processing capacity of computer on the client 470, or fluctuation of reproducing ate of stream data, etc. If that state continues, the receiving buffer 412 overflows, producing loss of data. In that case, the send rate on the server 400 side is changed as described below.

Namely, the rate change requesting means 413 of the client 470 constantly monitors the vacant capacity of the receiving buffer 412 and, when it detected a decrease of vacant capacity from prescribed set value (20% of the total capacity of receiving buffer, for example), notifies the packet transmitting means 411 of a request for change of rate for lowering the send rate together with the requested rate. Upon receipt of this notification of rate change request, the packet transmitting means 411 sends out a rate change request packet incorporating, as shown in FIG. 6(*b*), address of transmitter (address of client 470) (1), address of transmission destination (address of server) (2), packet identifier of being a rate change request (3), and requested rate (6), to the network 300 (see FIG. 2, steps S21 to S22 to S25).

The packet receiving means 401 of the server 400 receives said rate change request packet from the network 300, judges it to be a rate change request packet from its identifier, and delivers its contents to the rate change request processing means 406. At this, the rate change request processing means 406 delivers a new send rate to the rate controlling means 405 to request lowering of the send rate, and the rate controlling means 405 reads out the stream data from the transmission buffer 404 by lowering the send rate and delivers it to the packet transmitting means 402.

In this way, as the send rate of data packet is lowered, the vacant capacity in the receiving buffer 412 gradually increases. However, since this situation is also monitored by said rate change requesting means 413, said rate change requesting means 413 notifies the packet transmitting means 411 of a request for change of rate for raising the send rate in the case where the vacant capacity increased beyond a prescribed value (80% of the total capacity of the receiving buffer, for example), and the packet transmitting means 411, upon receipt of this notification, performs the same processing as above to prepare a rate change request packet and transmits it to the network 300 (see FIG. 2, steps S23 to S24 to S25).

The packet receiving means 401 of the server 400 receives said rate change request packet from the network 300 and, in the same way as in the change of rate in the case of lowering said send rate, the rate change request processing means 406 delivers the requested send rate to the rate controlling means 405, and the rate controlling means 405 makes a transmission at the increased send rate.

By proceeding as described above, the transfer rate of the stream data is lowered before the receiving buffer 412 of the client 470 overflows, preventing occurrence of loss of data, and the send rate of the stream data is raised before any shortage of stream data stored in the receiving buffer 412 of the client 470 is produced, thus making it possible to store the stream data in the receiving buffer 412 without loss.

While in the above example the send rate is determined on the client 470 side, it is possible to output only the rate change request and the vacant capacity (indicated with % of the total capacity of the receiving buffer, for example) of the receiving buffer 412 from the client 470, and set the actual send rate in the rate controlling means 405 by determining the send rate corresponding to said vacant capacity at the rate change request processing means 406 on the server 400 side.

Moreover, while in the above explanation the send rate is lowered when the vacant capacity of the receiving buffer 412 dropped to no more than a prescribed value and raised when the vacant capacity increased to over the prescribed value, it may be all right, as another method, to stop the send from the server 400 by putting the send rate to 0 when the vacant capacity of the receiving buffer 412 dropped under a prescribed value (20%, for example), and return the send rate to the prescribed value when the vacant capacity increased to no less than the prescribed value (over 80%, for example).

Even with adjustment of send rate as above, there are cases where loss of data packet is produced for some reason or another such as situation of network 300, etc. and there are also cases where loss of data packet is produced because of some external factor such as noise, etc.

For that reason, it is so arranged that the re-transfer requesting means 414 detects whether or not any loss as shown in FIG. 5(b) is produced in the stream data stored in the receiving buffer 412 of the client 470. In reality, the re-transfer requesting means 414 constantly monitors the packet receiving means 410 and, in case of any loss of position number (suffixed with "f" in FIG. 5), calculates the position number corresponding to the lost packet from the position numbers before and after that number. The position number calculated this way is informed to the packet transmitting means 411 together with the re-transfer request requesting re-transmission of data.

Figure 3:
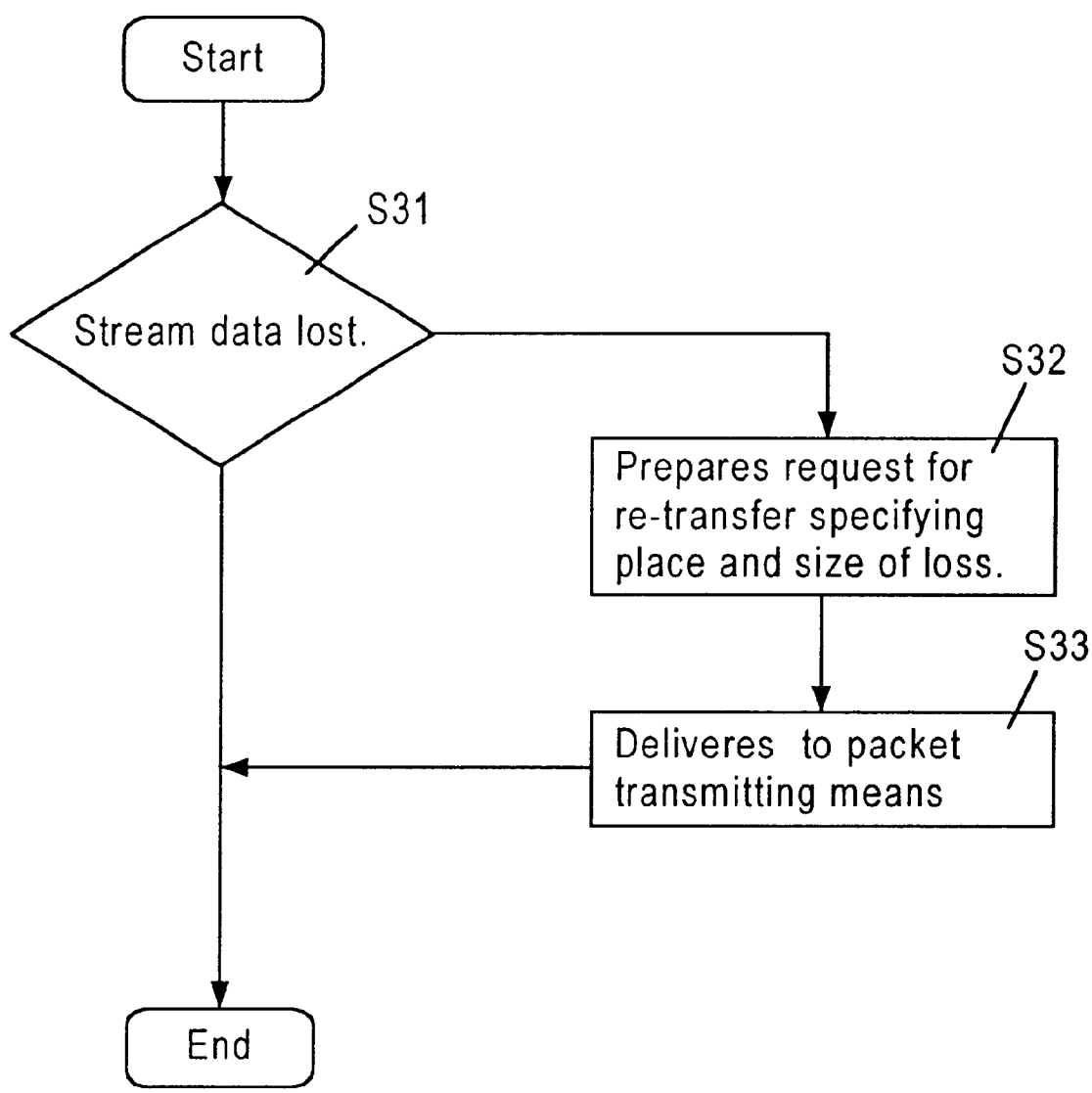
FIG. 3 is a flow chart showing the procedure of the present invention.

The packet transmitting means 411, upon receipt of said re-transfer request, sends out a re-transfer request packet indicated in FIG. 6(c) carrying transmitter's address (address of client) (1), transmission destination address (address of server) (2), packet type identifier (re-transfer request) (3), position number regarding re-transfer request (9) and size of data to be re-transferred (4) to the network 300 (see FIG. 3, steps S31 to S32 to S33).

The re-transfer request packet sent out to the network 300 this way is received by the packet receiving means 401 of the server 400, judged here as being a re-transfer request packet, and the contents of this packet are informed to the re-transfer controlling means 407. Upon receipt of this notification, the re-transfer controlling means 407 reads out stream data of prescribed size from the transmission buffer 404 according to the position number included in the re-transfer request and delivers it to the packet transmitting means 402.

The packet transmitting means 402, in the same way as for ordinary data transfer, incorporates the received data in the data packet indicated in FIG. 6(a) and sends it out to the network 300.

As described above, the packet receiving means 410 controls the packet number corresponding to the data stored in the receiving buffer 412 and the position number on said file. In the case where, in this state, a data packet is received by the packet receiving means 410, the packet receiving means 410 calculates the address on the receiving buffer 412 where to store the data, from the position number on said file attached to the packet concerned, and inserts it at the address where the data is lost.

By proceeding this way, this system can perform re-transfer at high speed even in case of occurrence of any loss of packet in the network, thus preventing loss of data.

Time information from the start point of the file can be used in place of the position number incorporated in the packet header as explained above.

Moreover, it is possible to manage packet numbers and position numbers coresponding to the data to be transmitted by the re-transfer controlling means 407 in the server 400. And it is possible for re-transfer requesting means 414 to issue the re-transfer request including the packet number.

As described above, according to the data transfer method of this embodiment, no loss of data is produced even in case of occurrence of any shortage of processing capacity of client, fluctuation of reproducing ate of stream data, etc. and, moreover, the transfer of stream data can be made without loss of data even in case of loss of packet in the network.

EMBODIMENT 2

By the way, when transferring one same data to a plural number of clients at a time, multicast transfer system is used in some cases. Namely, by defining one group in advance and register the clients to be destinations of transfer in that group, the server can transfer data to all registered clients belonging to the group. This makes it possible to transfer one same data to a plural number of clients efficiently, with no need of transferring the data individually to each object client from the server.

However, in the case where said embodiment is applied as it is to a multicast system, a case is produced where all clients constituting a specific multicast send said rate change request packet or said re-transfer request packet to the server, for example. In such a case, the load on the server and the network becomes excessively high, presenting a risk of occurrence of other trouble such as a phenomenon of interruption of display due to absence of data in the buffer on the client side, for example.

For that reason, the present embodiment proposes a construction in which said embodiment effectively works, even with a multicast type system.

Figure 7:
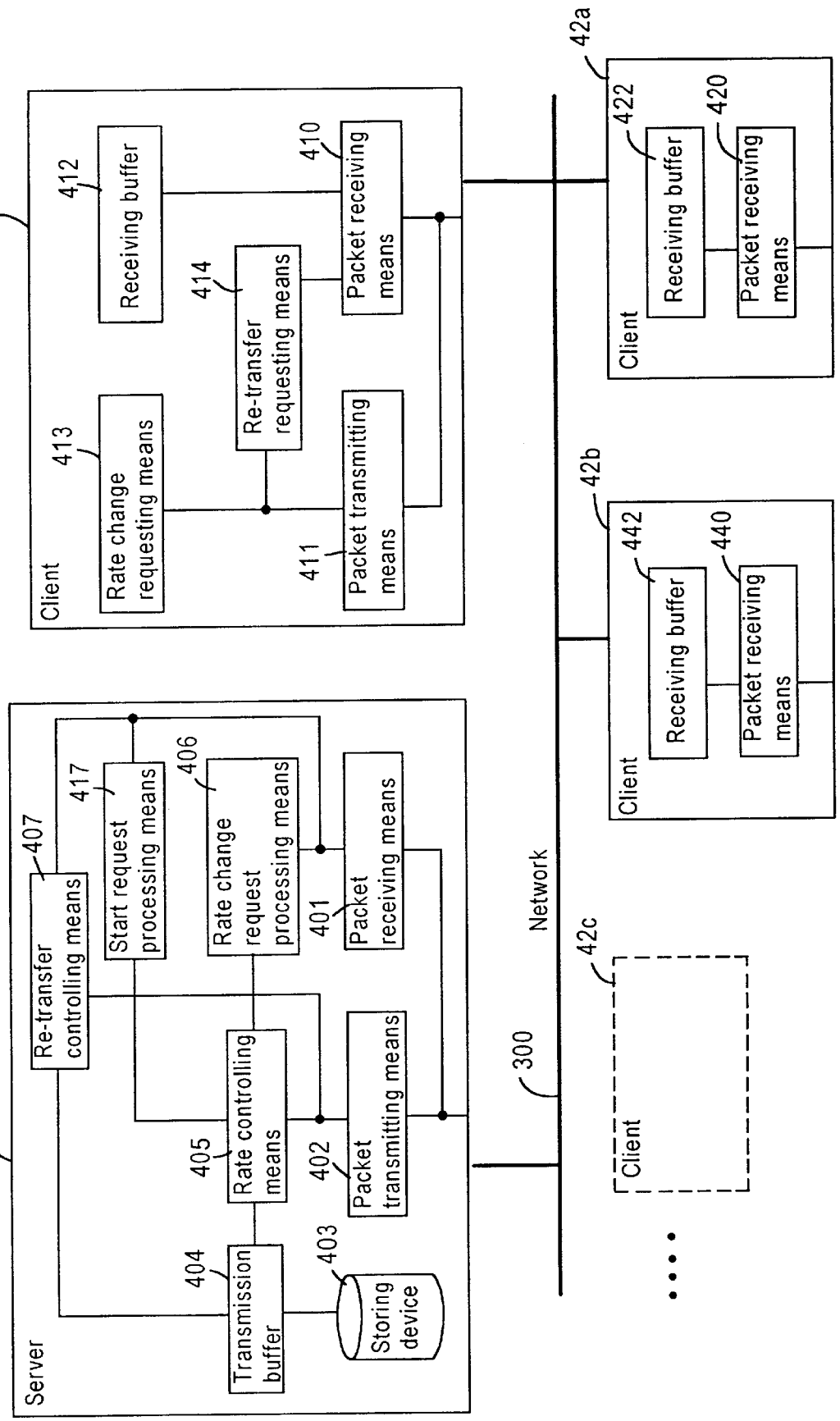
FIG. 7 is a block diagram of one embodiment of the present invention.

FIG. 7 is a block diagram showing one embodiment of the multicast stream data transfer system according to the present invention. The system construction of the present invention will be explained hereafter together with its procedure based on FIG. 7.

In FIG. 7, the multicast group is composed of a server 400 on the side providing data, a client (hereinafter referred to as "requesting client") 41a provided with rate change request function and re-transfer request function on the side receiving the supply of data, and clients (hereinafter referred to as "ordinary clients") 42a, 42b, - - - not provided with rate change request function and re-transfer request function also on the side receiving the supply of data, and a network 300 intervenes between said server 400 and the requesting client 41*a* and the ordinary clients 42*a*, 42*b*, - - - . However, it is also possible to have said requesting client in a plural number as required.

Namely, while said requesting client 41*a* is provided, in the same way as the client 470 indicated in FIG. 1, with at least one of rate change requesting means 413 and re-transfer requesting means 414, the ordinary clients 42*a*, 42*b*, - - - are not provided with them.

In said construction, at an instruction for start of data transfer by the operator, etc. at said server 400 or a request for start of transfer, etc. from a requesting client 41*a*, the start request processing means 417 delivers matters identifying a file such as file name, file number, etc. to the rate controlling means 405, and starts that rate controlling means 405. At this, the rate controlling means 405 reads out the stream data from the specified address in the storing device 403 one after another, and once stores that data in the transmission buffer 404.

After that, data transfer is executed between the requesting client 41*a* and the server, but explanation on this data transfer is omitted here because its procedure is exactly the same as the contents described in the explanation of said FIG. 1. However, since this embodiment is applied to a multicast system, the stream data from the server is transferred not only to the requesting client 41*a* but also to said ordinary clients 42*a*, 42*b*, - - - at the same time.

Figure 2:
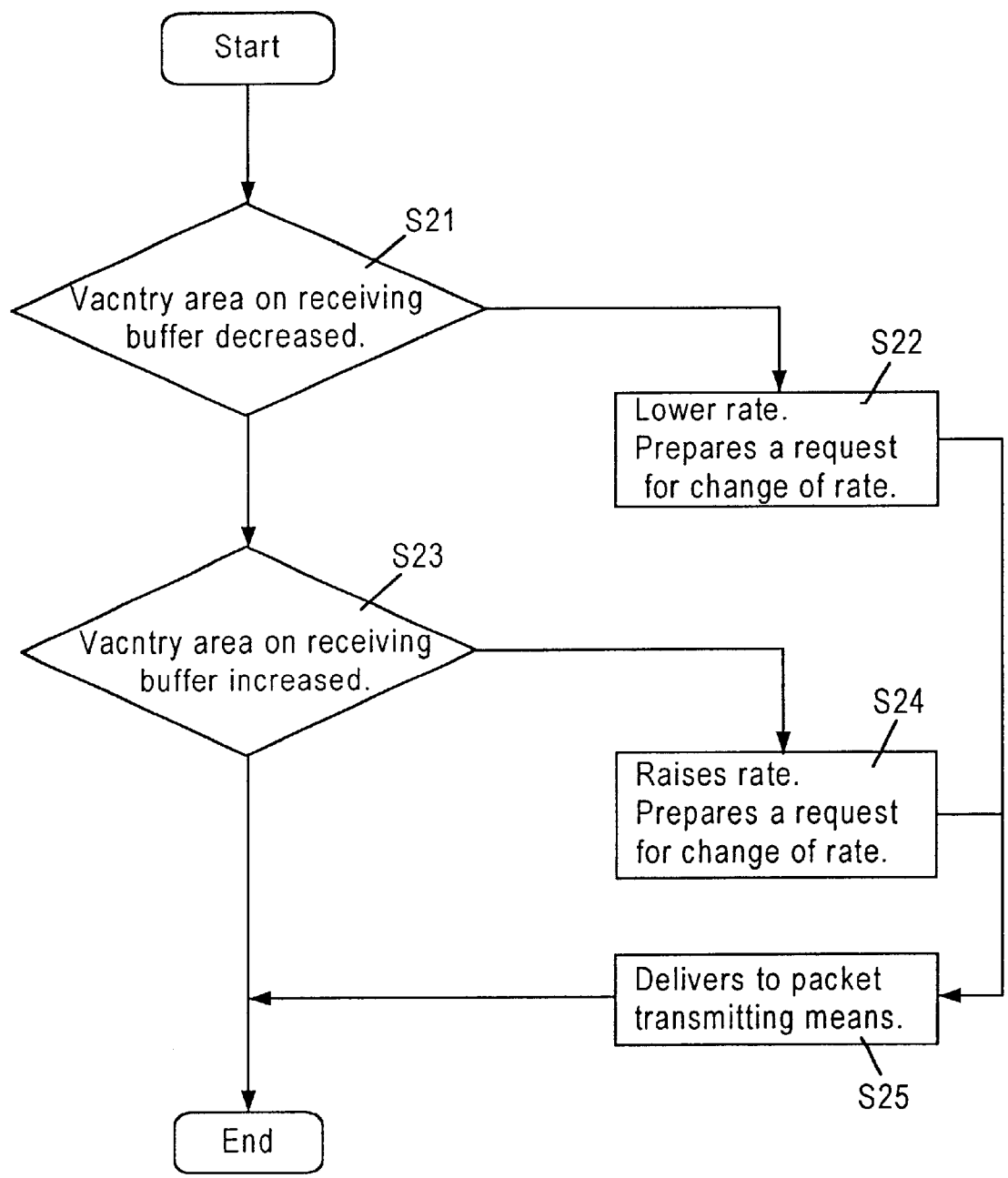
FIG. 2 is a flow chart showing the procedure of the present invention.

The procedure of issuing a rate change request in the case where the vacant capacity of the receiving buffer 412 of the requesting client 41*a* became lower than the prescribed value (higher than the prescribed value) is the same as the procedure explained in FIG. 2 and, therefore, explanation on this procedure will be omitted here. Moreover, the procedure of issuing a re-transfer request in case of occurrence of a loss of the stream data received by the requesting client 41*a* is also the same as the procedure explained in said FIG. 3 and, therefore, explanation on it will be omitted here. In this embodiment, which is constructed in such a way that only the requesting client 41*a* is provided with a rate change requesting means 413 and a re-transfer requesting means 414, the right of issuing said request for re-transfer and the right of issuing said request for change of rate are given only to the requesting client 41*a*. However, when said request for change of rate is issued by the requesting client 41*a*, the data transfer rate to all clients constituting the multicast is changed. In addition, in the case where any specific data packet is transferred again in response to said request for re-transfer, that packet is received by all clients constituting the multicast.

Figure 8A:
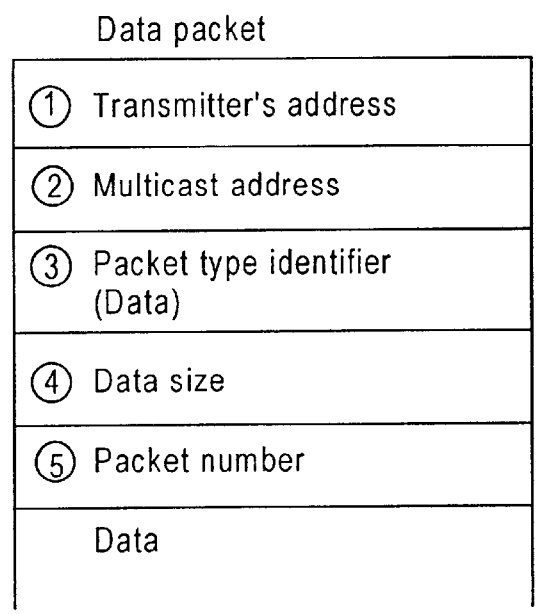
FIG. 8 is a conceptual drawing showing various types of packet structure used for the present invention.
Figure 8B:
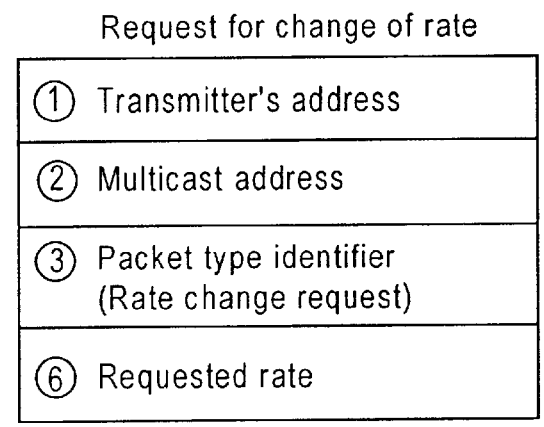
Figure 8C:
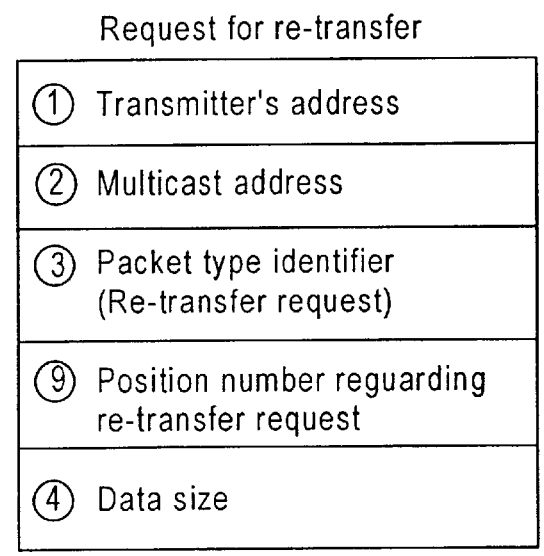

Furthermore, while the data packet (FIG. 8(*a*)), rate change request packet (FIG. 8(*b*)), and re-transfer request packet (FIG. 8(*c*)) used here are about the same in contents as the respective packets indicated in FIG. 6, multicast address (address common to a plural number of clients constituting a multicast) is used as transmission destination address.

Figure 9:
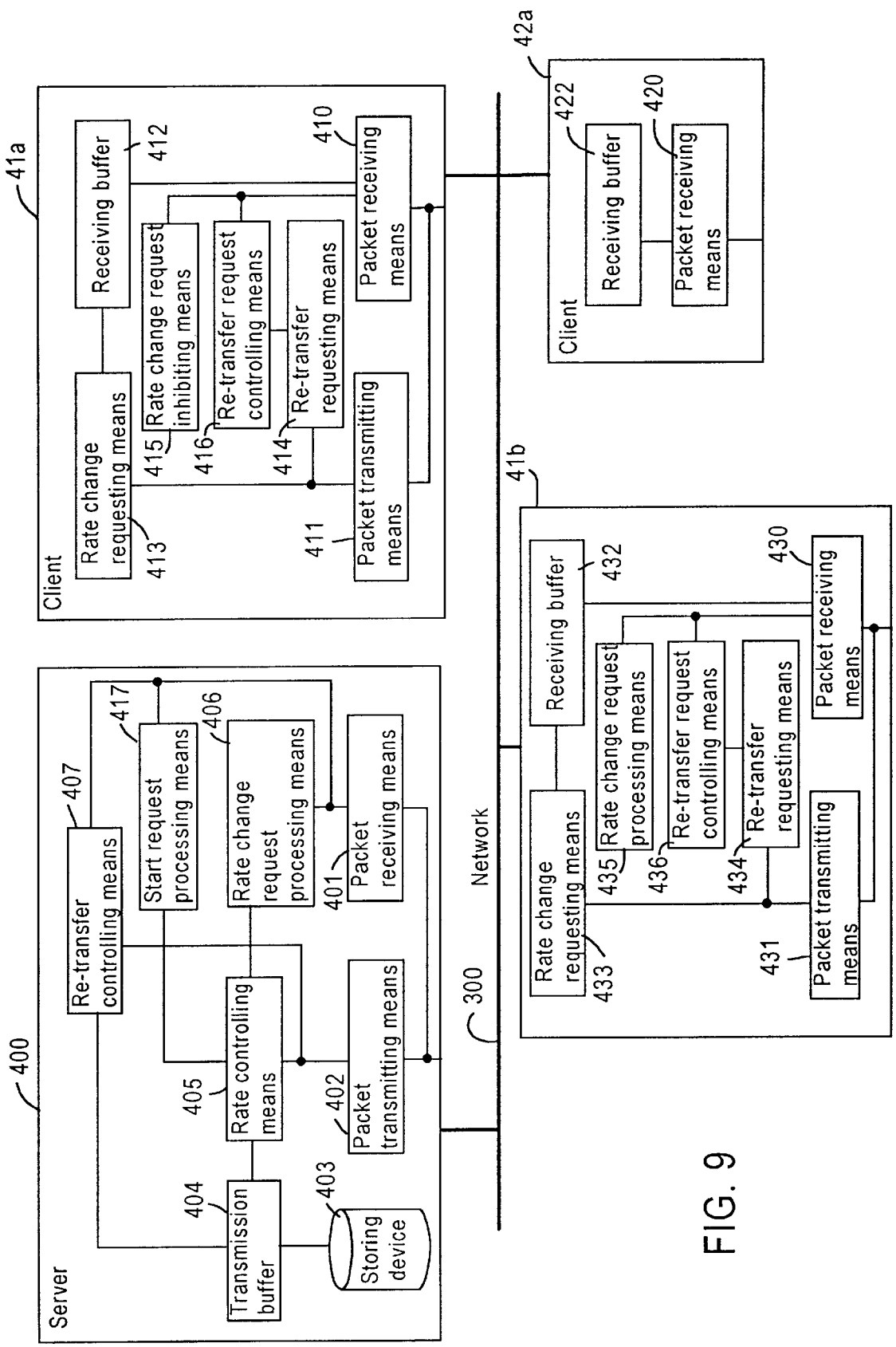
FIG. 9 is a block diagram of other embodiment of the present invention.

Next, FIG. 9 is a block diagram showing other embodiment of the multicast stream data transfer system according to the present invention. The system construction of the present invention will be explained hereafter together with its procedure based on FIG. 9. Explanation will be omitted on the construction and procedure identical to those in said embodiment.

In the case where a rate change request is issued by the rate change requesting means 433 of the requesting client 41*b*, the packet receiving means 431 which received notification of this rate change request sends out, for the server and all clients receiving data in one same multicast group, a rate change request packet carrying, as shown in FIG. 8(*b*), transmitter's address (address of requesting client 41*b*) (1), address of multicast (2), packet identifier of being a data change request packet (3), and requested rate (6), to the network 300.

The packet transmitting means 411 of the requesting client 41*a* receives said rate change request packet from the network 300, judges it to be a rate change request packet from its identifier and notifies the rate change request inhibiting means 415 of the contents of that packet. At this notification, the rate change request inhibiting means 415 prohibits said rate change requesting means 413 to issue any rate change request of the same contents as those of said rate change request for a prescribed time set in advance. The processing based on said rate change request packet from the requesting client 41*b* received by said server 400 is the same as that in said embodiment. Moreover, the processing is the same as that in said embodiment also in the case where a rate change request is issued by the rate change requesting means 413 of the requesting client 41*a*. Furthermore, said rate change request packet also reaches the ordinary client 429, but this point will be ignored here because the ordinary client 429 has no rate change request function.

Next, in the case where a request for re-transfer is issued by the re-transfer requesting means 434 of the requesting client 41*b*, the packet receiving means 431 which received notification of this re-transfer request sends out, for the server and all clients receiving data in one same multicast group, a re-transfer request packet carrying, as shown in FIG. 8(*c*), transmitter's address (address of requesting client 41*b*) (1), address of multicast (2), packet type identifier (re-transfer request) (3), position number concerning the re-transfer request(9), and size data to be re-transferred (4), to the network 300.

The packet transmitting means 411 of the requesting client 41*a* receives said re-transfer request packet from the network 300, judges it to be a re-transfer request packet from its identifier and notifies the re-transfer request inhibiting means 416 of the contents of that packet. The re-transfer request inhibiting means 416 prohibits said re-transfer requesting means 434 to issue any re-transfer request of the same contents as those of said re-transfer request for a prescribed time set in advance. The processing based on said re-transfer request packet from the requesting client 41*b* received by said server 400 is the same as that in said embodiment. Moreover, the processing is the same as that in said embodiment also in the case where a rate change request is issued by the rate change requesting means 413 of the requesting client 41*a*. Furthermore, in the same way as in the case said rate change request, said re-transfer request packet also reaches the ordinary client 42*a*, but this point will be ignored here because the ordinary client 42*a* has no re-transfer request function.

As described above, the load on said server 400 and the network 300 can be controlled with no issuance of any rate change request of one same contents as those of the rate change request already transmitted by other requesting client and with no issuance of any re-transfer request of one same contents as those of the re-transfer request already transmitted by other requesting client.

Figure 10:
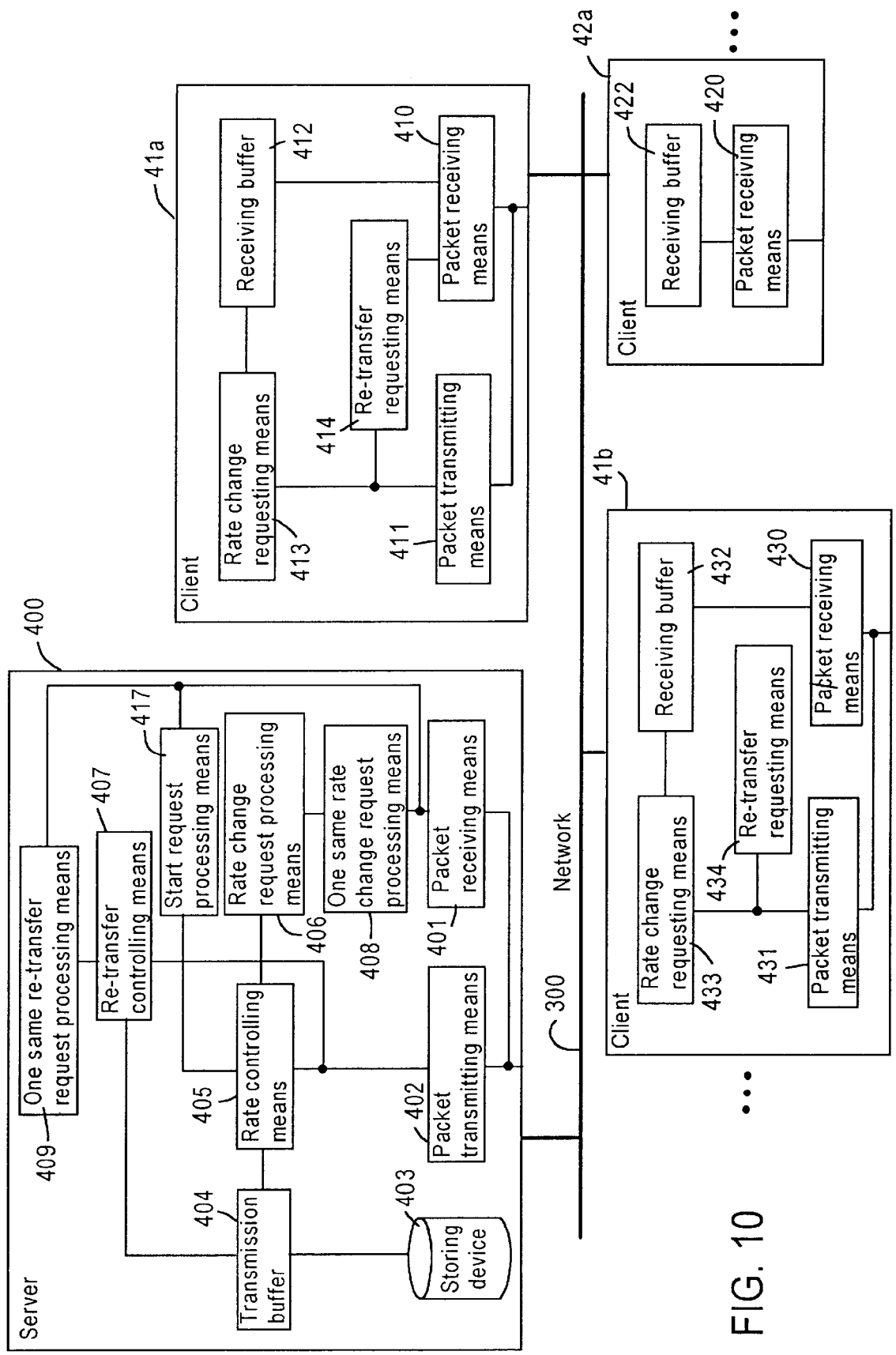
FIG. 10 is a block diagram of other embodiment of the present invention.

FIG. 10 is a block diagram showing other embodiment of the multicast stream data transfer system according to the present invention. The system construction of the present invention will be explained hereafter together with its procedure based on FIG. 10. Explanation will be omitted on the construction and procedure identical to those in said embodiment.

In the case where the requesting clients 41a 41b - - - transmitted a rate change request packet, the packet receiving means 401 of the server 400 receives said rate change request packet from the network 300, judges it to be a rate change request packet from its identifier, and notifies the one same rate change request processing means 408. The one same rate change request processing means 408 validates the rate change request received in the first place among the rate change requests notified within a prescribed time set in advance, and delivers its contents to the rate change request processing means 406. For example, in the case where one same rate change request was received from said requesting client 41a and requesting client 41b within said prescribed time set in advance (suppose that the rate change request from said requesting client 41a was received first here), the one same rate change request processing means 408 validates the rate change request from said requesting client 41a and delivers its contents to the rate change request processing means 406, while treating the rate change request from said requesting client 41b as invalid. At this, the rate change request processing means 406 delivers a new send rate to the rate controlling means 405 based on the rate change request from said requesting client 41a, and the rate controlling means 405 reads out the stream data from the transmission buffer 404 at the new send rate and delivers it to the packet transmitting means 402.

Next, in the case where the requesting clients 41a 41b - - - transmitted a re-transfer request packet, the packet receiving means 401 of the server 400 receives said re-transfer request packet from the network 300, judges it to be a re-transfer request packet from its identifier, and notifies the one same re-transfer request processing means 409. The one same re-transfer request processing means 409 validates the re-transfer request received in the first place among the re-transfer requests notified within a prescribed time set in advance, and delivers its contents to the re-transfer control means 407. For example, in the case where one same re-transfer request was received from said requesting client 41a and requesting client 41b within said prescribed time set in advance (suppose that the re-transfer request from said requesting client 41a was received first here), the one same re-transfer request processing means 409 validates the re-transfer request from said requesting client 41a and delivers its contents to the re-transfer control means 407, while treating the re-transfer request from said requesting client 41b as invalid. At this, the re-transfer control means 407 reads out the stream data of prescribed size from the transmission buffer 404 according to the position number included in the request for re-transfer from said requesting client 41a and delivers it to the packet transmitting means 402.

As described above, it becomes possible to control the load on said server 400 and the network 300 by treating rate change requests of one same contents as a single rate change request and also treating re-transfer requests of one same contents as a single rate change re-transfer request.

By the way, even among clients registered in one same multicast group, there exist clients having difficulty of coexistence in one same multicast group, because of differences in the ability of individual clients, such buffer capacity, buffer processing speed, etc., for example. Explanation will be given hereafter on a construction in which said embodiments effectively works even in such a case.

Figure 11:
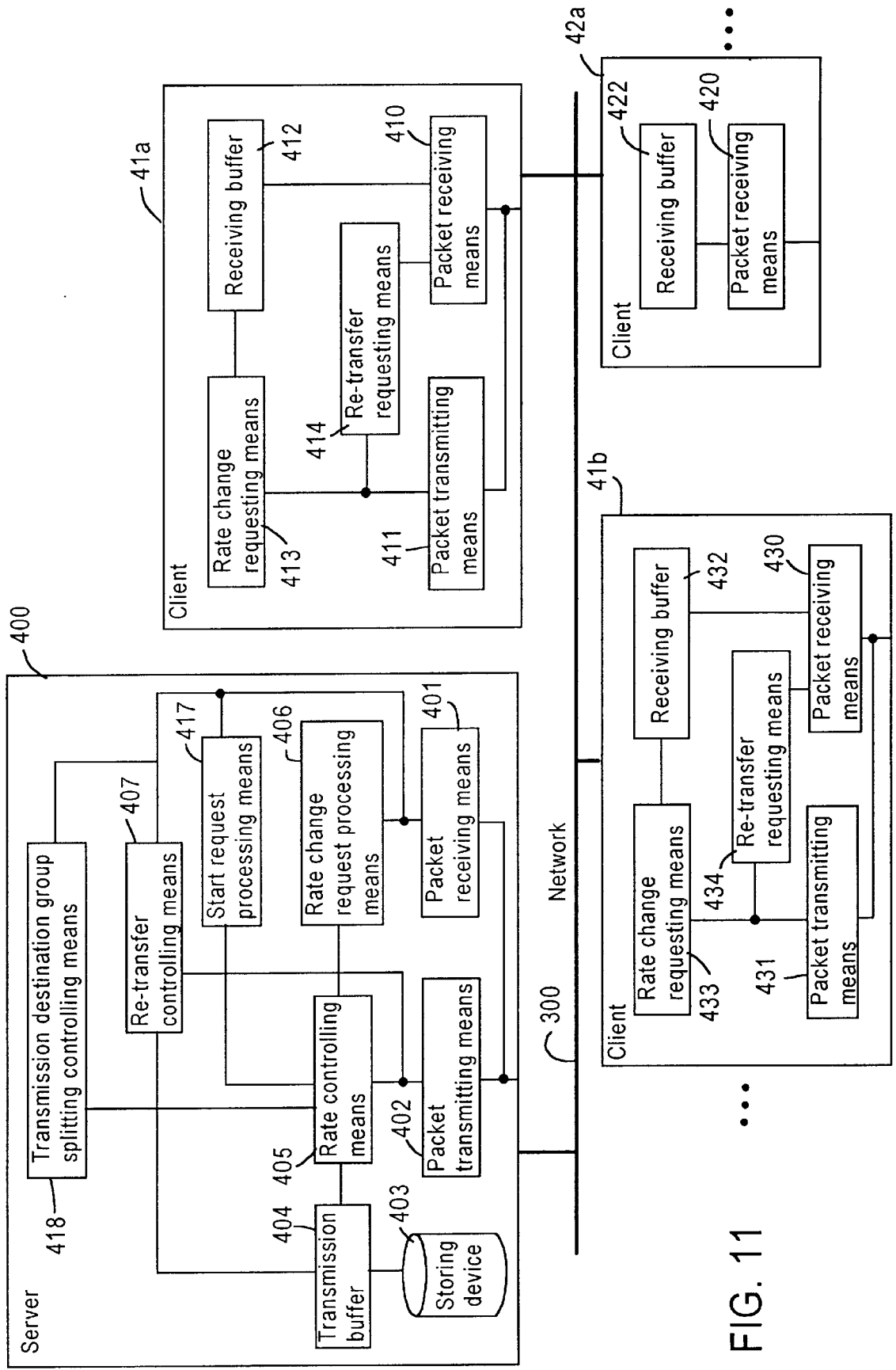
FIG. 11 is a block diagram of other embodiment of the present invention.

FIG. 11 is a block diagram showing other embodiment of the multicast stream data transfer system according to the present invention. The system construction of the present invention will be explained hereafter together with its procedure based on FIG. 11. Explanation will be omitted on the construction and procedure identical to those in said embodiment.

The requesting clients 41a, 41b, - - - transmit, by either an instruction for transfer of rate change conditions by operator, etc. at said server 400 or voluntary transmission from the requesting clients 41a, 41b - - - , a condition notification packet for notifying the conditions of rate change request. The conditions for issuing said rate change request to be notified by this condition notification packet here are buffer capacity, buffer processing speed, etc., for example. Next, the packet receiving means 401 of the server 400 receives said condition notification packet from the network 300, judges it to be a condition notification packet from its identifier, and delivers its contents to the transmission destination group split controlling means 418.

The transmission destination group split controlling means 418 judges if coexistence is possible or not in the multicast group to which the respective requesting clients currently belong. Here, the transmission destination group split controlling means 418 controls as as to transfer the data by other multicast group to clients having conditions with difficulty of coexistence in one same multicast group based on the rate change conditions transmitted from respective requesting clients. And then the rate controlling means 405 is notified of the send rate by that other multicast group.

The rate controlling means 405 reads out the stream data from the transmission buffer 404. It then delivers the data to the packet transmitting means 402, at a specific send rate conformable to the conditions concerned for requesting clients having conditions enabling coexistence in one same multicast group, and at said notified other send rate for said other multicast group.

Figure 12:
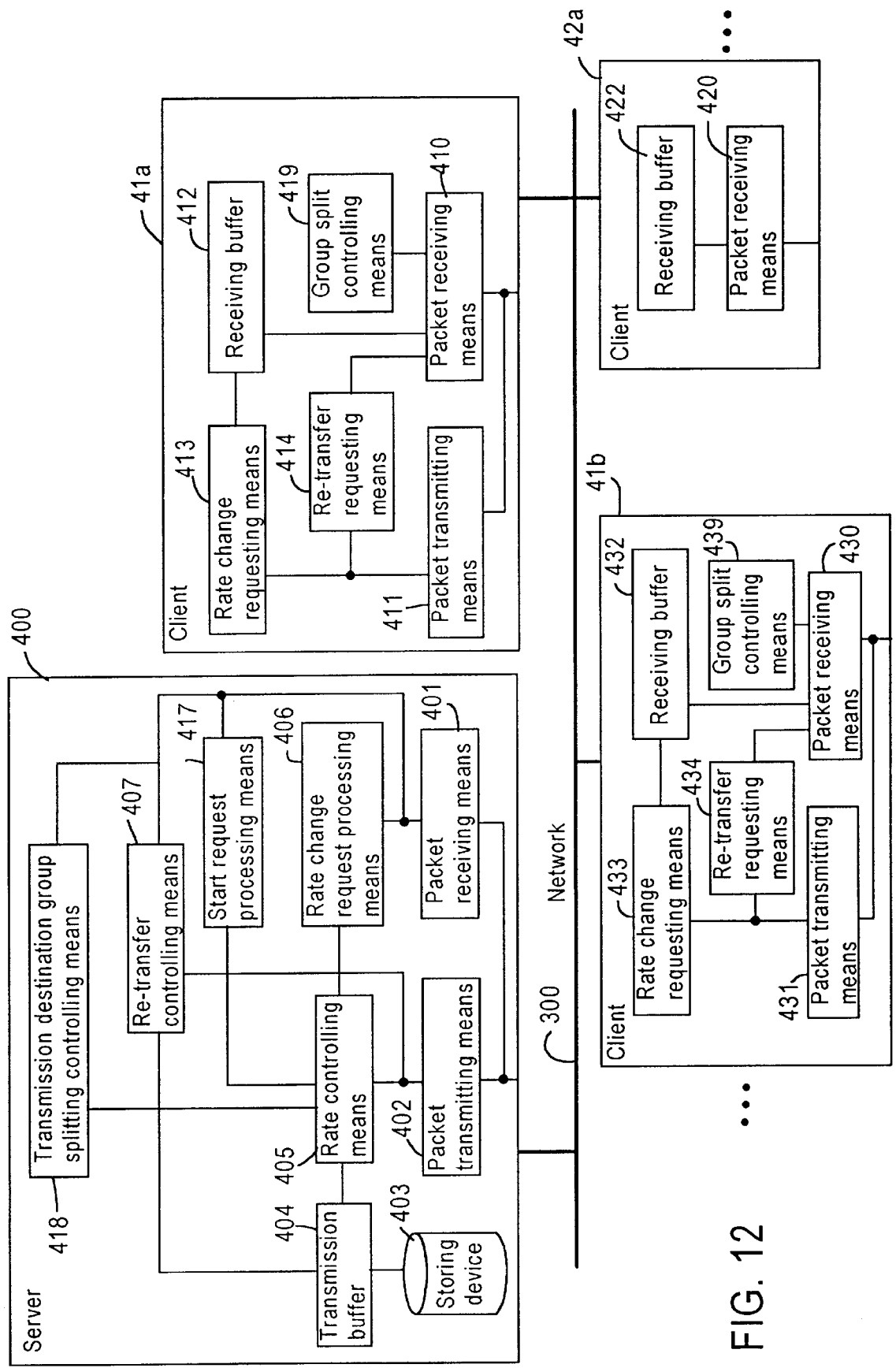
FIG. 12 is a block diagram of other embodiment of the present invention.

FIG. 12 is a block diagram showing other embodiment of the multicast stream data transfer system according to the present invention. The system construction of the present invention will be explained hereafter together with its procedure based on FIG. 12. Explanation will be omitted on the construction and procedure identical to those in said embodiment.

Before transmission of stream data, the respective requesting clients 41b, - - - transmit a condition notification packet for notifying the conditions of rate change request. The conditions for issuing said rate change request to be notified by this condition notification packet here are buffer capacity, buffer processing speed, etc., for example, in the same way as in said embodiment. Next, the packet receiving means 410 of the requesting client 41a receives said condition notification packet from the network 300, judges it to be a condition notification packet from its identifier, and delivers its contents to the group split controlling means 419. In the case where the group split controlling means 419 judged, based on the rate change conditions transmitted from respective requesting clients, that the requesting client 41a has conditions with difficulty of coexistence with other respective requesting clients in one same multicast group, this requesting client 41a performs data reception in separate multicast group. The same processing is made also by respective requesting clients 41b, - - - .

Here, one requesting client set in advance among the respective requesting clients 41a, - - - makes a notification to said server 400 to the effect that data reception is made also in said separate multicast group. Upon receipt of this notification, the transmission destination group split controlling means 418 of said server 400 controls in a way to transfer the data by other multicast group to clients having conditions with difficulty of coexistence in one same multicast group based the notification, and notifies the rate controlling means 405 of the send rate by that other multicast group. The rate controlling means 405 reads out the stream data from the transmission buffer 404 and delivers it to the packet transmitting means 402, at ordinary send rate for requesting clients having conditions enabling coexistence in one same multicast group, and at said notified other send rate for said other multicast group.

As described above, by making a plural number of clients having conditions enabling coexistence belong to one same multicast group and distribution stream data under the respective multicast addresses for the respective multicast groups, it becomes possible to improve the reliability of data transfer to a larger number of clients.

Explanation has so far been given only on a case where stream data received by a receiving buffer is reproduced, but a case is also conceivable in which the stream data is stored in a storing means such as hard disc, etc., for example.

Figure 13:
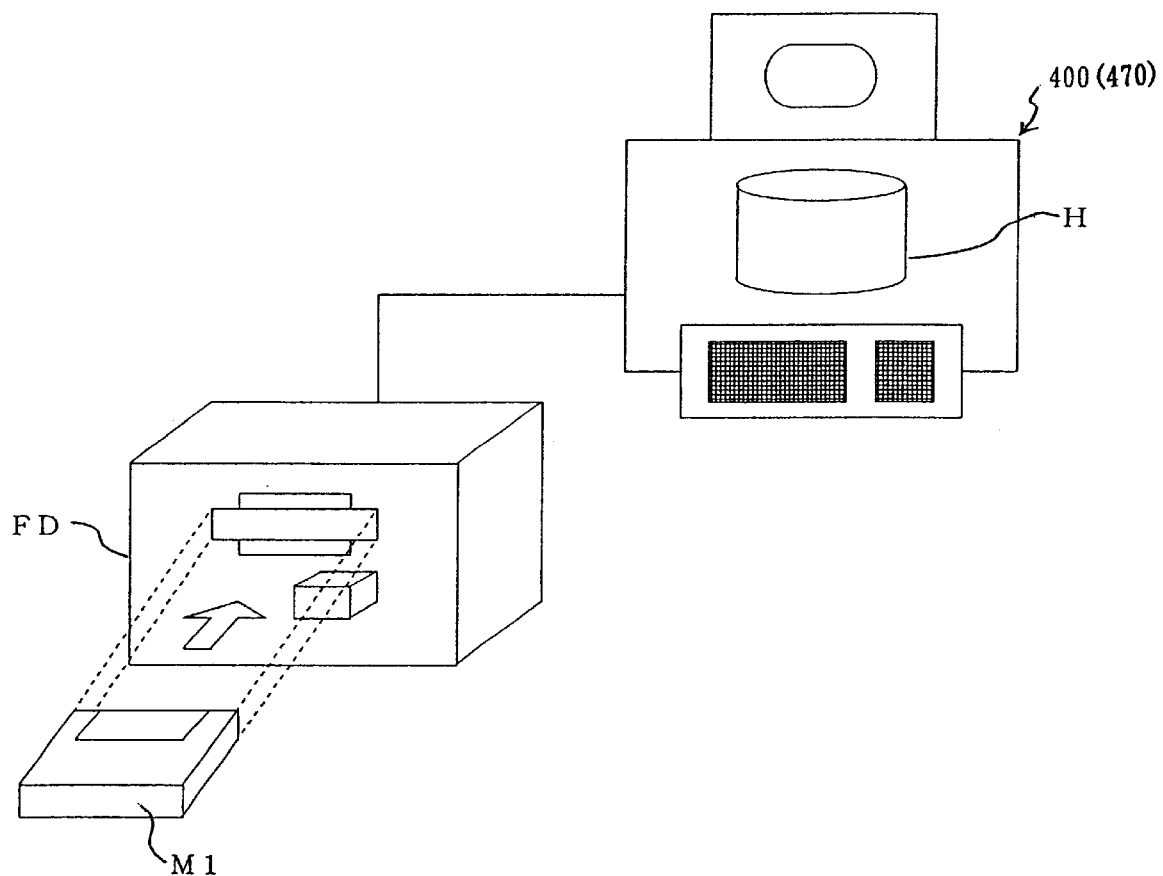
FIG. 13 is a conceptual drawing showing a form of embodiment of the present invention by portable medium.
Figure 14:
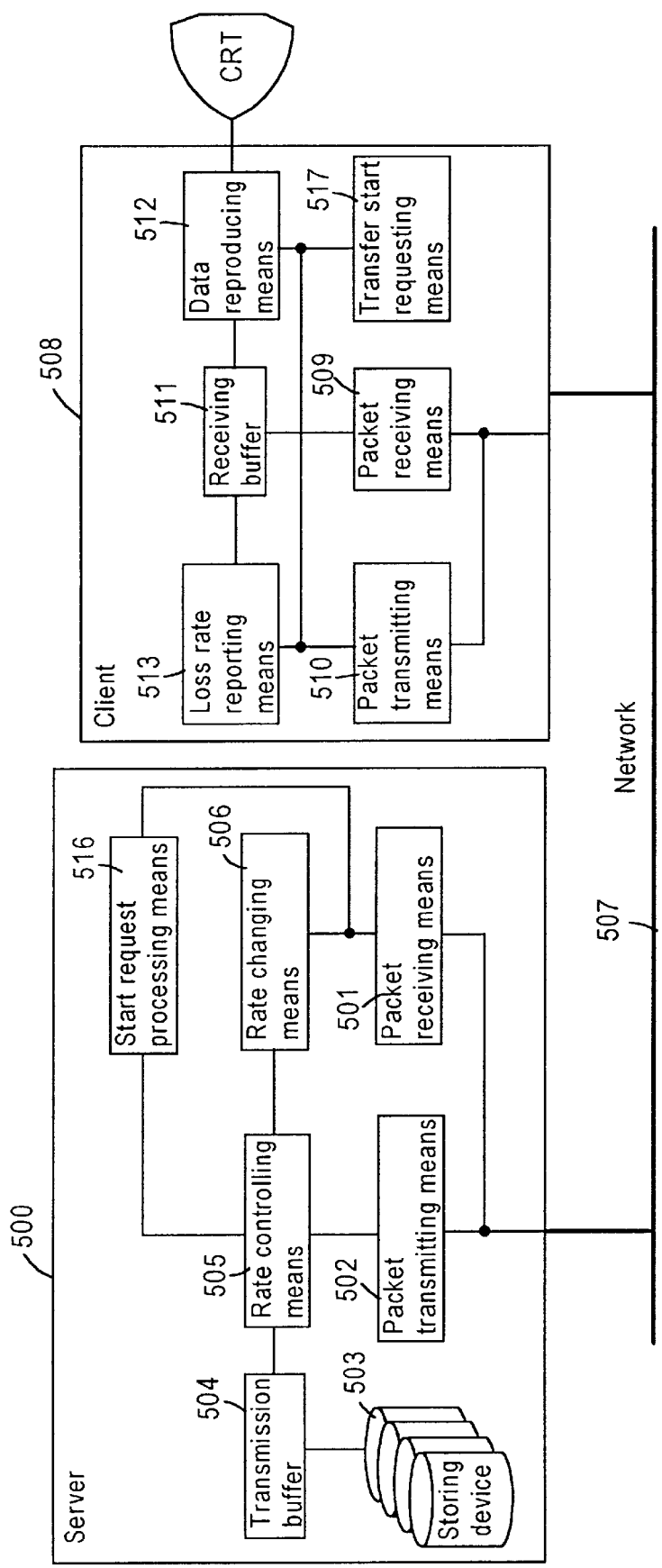
FIG. 14 is a block diagram of the stream data transfer system in a conventional example.
Figure 15:
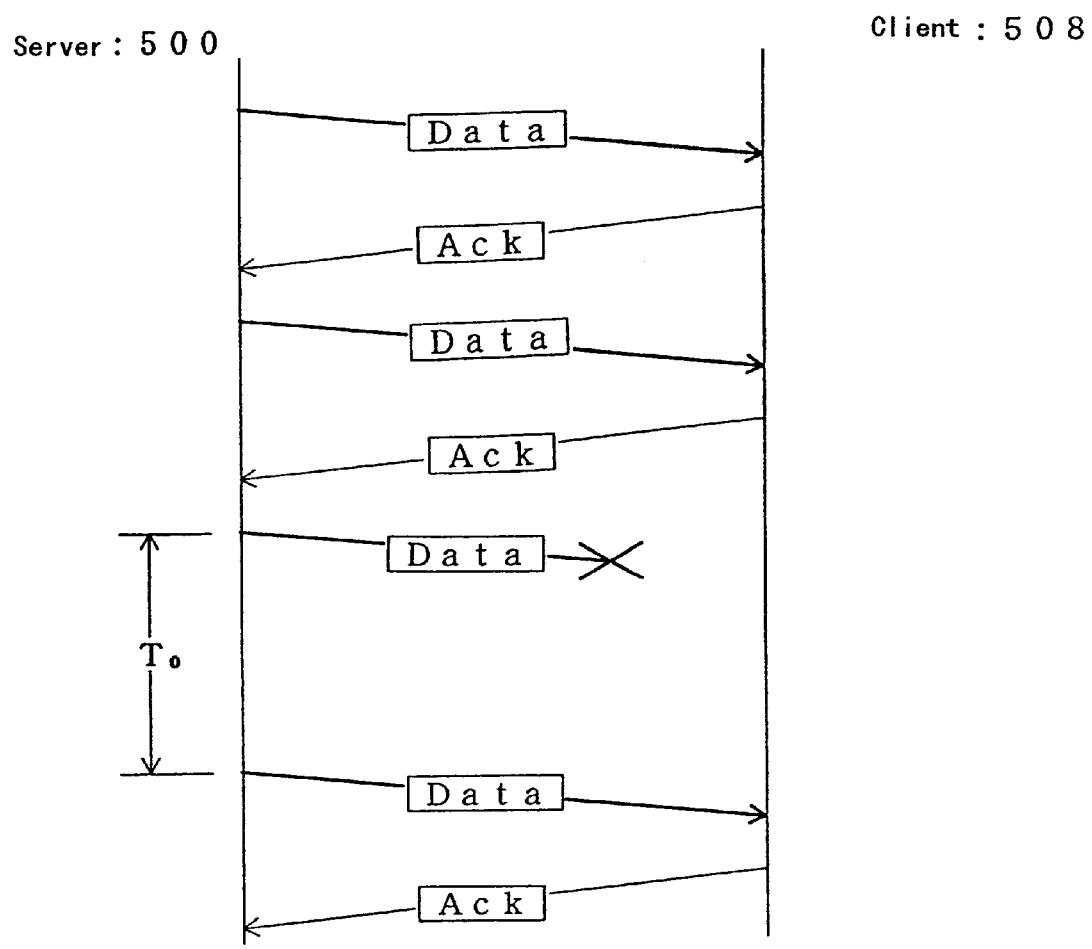
FIG. 15 is a conceptual drawing showing an example of trouble by the conventional method.

The system of the present application can be executed by either hardware or software. In the case of execution by software, an embodiment is made by incorporating a program on a storing means H such as hard disc, etc. (storing device 503, for example). Moreover, the program incorporated here can be prepared by transplanting a program stored on a portable medium such as floppy disc M1, etc. to the server or the storing means H of the client 470 through a floppy disc drive FD, as shown in FIG. 13.

As it is apparent from the explanation given above, according to the present invention, no omission of data is produced because no overflowing of stream data takes place in the receiving buffer. Moreover, even in case of occurrence of loss of data for some reason or another, such loss of data can be compensated for thanks to the possibility-of re-transfer of lost data.

Furthermore, the present invention can be applied even to a multicast system constituted by a plural number of clients and servers.

What is claimed is:

1. A stream data transfer system, comprising a server for editing, upon receipt of a request for start of transfer from a client, stream data read out at prescribed send rate from storing means based on the control by a rate controlling means into packet and transferring said data to the client through a network, and a client for receiving the data sent out from the server with packet receiving means and storing said data in a receiving buffer temporarily,
in which the server comprises:
the rate controlling means for delivering to the packet transmitting means data to be transferred by attaching information indicating the position on the file of that data to the data; and
re-transfer controlling means for performing re-transfer of the data corresponding to the lost data based on information indicating the position on the file of that data in correspondence to the state of loss of data received by the packet receiving means of the client and
in which the client comprises;
re-transfer requesting means for monitoring loss of the data received by said packet receiving means and requesting re-transfer of the data corresponding to the lost data by attaching information indicating the position on the file of that data to the data, said re-transfer requesting means determines a lost data position number corresponding to a lost data element based on position numbers before and after the lost data position number.

2. A stream data transfer system, comprising a server for editing, upon receipt of a request for start of transfer from a client, stream data read out at prescribed send rate from storing means based on the control by a rate controlling means into packet and transferring said data to the client through a network, and a client for receiving the data sent out from the server with packet receiving means and storing said data in a receiving buffer temporarily,
in which the server comprises:
the re-transfer controlling means for performing the re-transfer of the data by managing information identifying the position on the file of the data and packet number relating with each other, and in response to the re-transfer request, determining the lost packet by the packet number included in the re-transfer request, and
in which the client comprises:
re-transfer requesting means for monitoring loss of the data received by said packet receiving means and requesting re-transfer of the data corresponding to the lost data by attaching the packet number to the data, said re-transfer requesting means determines a lost data position number corresponding to a lost data element based on position numbers before and after the lost data position number.

3. A multicast stream data transfer method in which the steps of transferring stream data from a storing means on the server side to a single client or a plurality of clients belonging to one same multicast group at a prescribed send rate through a network, and, on the client side, receiving said stream data sent from the server with a packet receiving means and storing said data in a receiving buffer temporarily, which comprising the steps of:
issuing a request for re-transfer from a specific client to the server and all clients belonging to said one same multicast in correspondence to a loss of the data received by the packet receiving means of a specific client belonging to one same multicast group, said step of issuing a request for re-transfer includes determining a lost data position number corresponding to a lost data element based on position numbers before and after the lost data position number;
prohibiting for a prescribed time set in advance from issuing the request for re-transfer identical to the request for re-transfer issued from the other specific clients; and
transferring the data corresponding to the lost data from the storing means of the server based on that request for re-transfer.

4. A multicast stream data transfer method in which the steps of transferring stream data from a storing means on the server side to a single client or a plurality of clients belonging to one same multicast group at a prescribed send rate through a network, and, on the client side, receiving said stream data sent from the server with a packet receiving means and storing said data in a receiving buffer temporarily, which comprising the steps of:
issuing a request for re-transfer from a specific client to the server in correspondence to a loss of the data received by the packet receiving means of a specific client belonging to one same multicast group, said step of issuing a request for re-transfer includes determining a lost data position number corresponding to a lost data element based on position numbers before and after the lost data position number; and sending out data corresponding to the lost data from the storing means of the server side based on the request for re-transfer validated by the server that one of those re-transfer requests is validated in the case where a request for re-transfer of one same contents was received from a plurality of clients within a prescribed time set in advance.

5. A multicast stream data transfer method as defined in claim 3, wherein said server validates, in the case where a request for re-transfer of one same contents was received from a plurality of clients within a prescribed time set in advance, one of those re-transfer requests and send out the data corresponding to the lost data from the storing means of the server side based on that request for re-transfer.

6. A multicast stream data transfer system transferring stream data from a storing means on the server side to a single client or a plurality of clients belonging to one same multicast group at a prescribed send rate through a network, and, on the client side, receiving said stream data sent out from the server with a packet receiving means and once storing it in a receiving buffer, characterized in that said server is provided with a re-transfer controlling means for performing re-transfer of the data corresponding to the lost data, based on the request for re-transfer issued from the client side in correspondence to the state of loss of data received by the packet receiving means of the client, while said specific client belonging to one same multicast group is provided with a re-transfer requesting means for monitoring loss of the data received by said packet receiving means and requesting re-transfer of the data corresponding to the lost data, said re-transfer requesting means determines a lost data position number corresponding to a lost data element based on position numbers before and after the lost data position number.

7. A multicast stream data transfer system as defined in claim 6, wherein said re-transfer requesting means transfers said re-transfer request to said server and all clients belonging to said one same multicast group, while said specific client is provided with a re-transfer inhibiting means for inhibiting issuance of re-transfer request of contents identical to those of the re-transfer request issued by other specific client, for a prescribed time set in advance.

8. A multicast stream data transfer system as defined in claim 6, wherein said server is provided with a one same re-transfer request processing means for validating, in the case where said server received request for re-transfer of one same contents from a plural number of clients within a prescribed time set in advance, one of those re-transfer requests.

* * * * *